Figure 1:
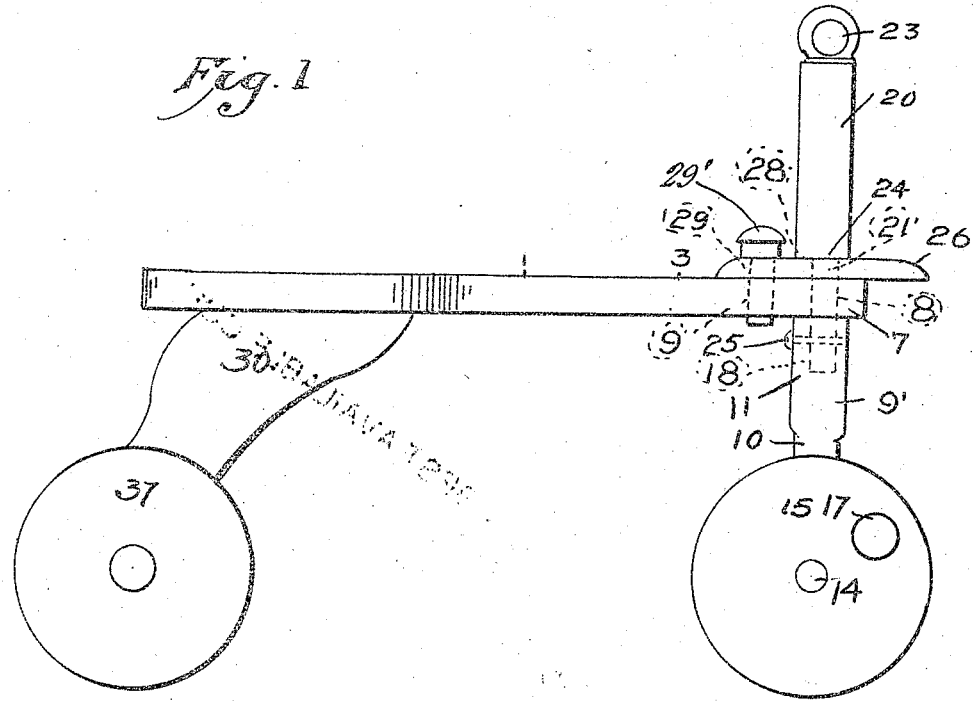

H. W. CASE.
CHILD'S VEHICLE.
APPLICATION FILED APR. 27, 1917.

1,258,871.

Patented Mar. 12, 1918.
2 SHEETS—SHEET 1.

WITNESS
R. F. Dilworth

INVENTOR.
Homer W. Case
By Max N. Solomon
Attorney

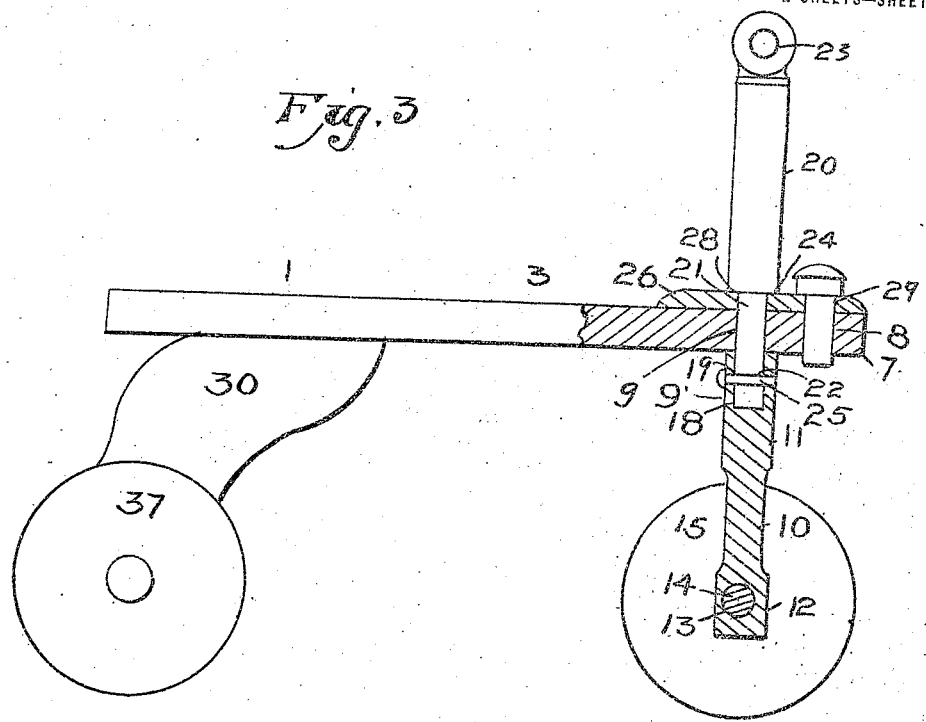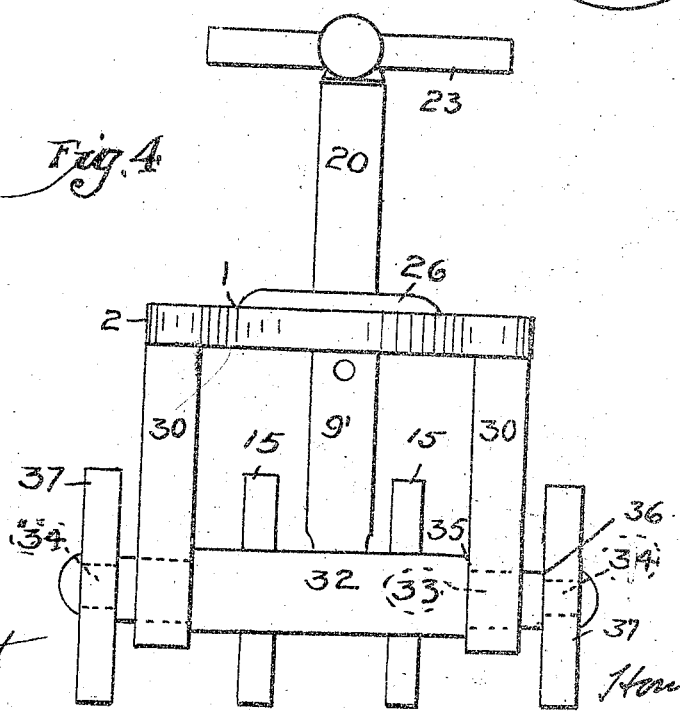

UNITED STATES PATENT OFFICE.

HOMER W. CASE, OF PITTSBURGH, PENNSYLVANIA, ASSIGNOR TO PITTSBURGH TOY VEHICLE COMPANY, OF PITTSBURGH, PENNSYLVANIA, A CORPORATION.

CHILD'S VEHICLE.

1,258,871.  Specification of Letters Patent.  Patented Mar. 12, 1918.

Application filed April 27, 1917. Serial No. 164,848.

*To all whom it may concern:*

Be it known that I, HOMER W. CASE, a citizen of the United States of America, residing at Pittsburgh, county of Allegheny and State of Pennsylvania, have invented certain new and useful Improvements in Children's Vehicles, of which the following is a specification.

This invention relates to child's vehicles more particularly children's push cars, and has for its object to provide a vehicle or car of such class, having means whereby the child can retard the speed of the car when coasting.

A further object of the invention is to provide a car of such class, with means in a manner as hereinafter set forth, whereby the rear axle of the car can be utilized to support the child standing while coasting.

A further object of the invention is to provide a car of such class, with means in a manner as hereinafter set forth, whereby the length of the body portion can be increased or diminished so the car can be used by a large or small child.

A further object of the invention is to provide a car of the class referred to with means to permit of the child grasping the front wheels when coasting for the purpose of braking the speed of the car or for the purpose of holding on to the car.

Further objects of the invention are to provide a car of the class referred to which is simple in its construction and arrangement, strong, durable, efficient in its use, conveniently steered, and comparatively inexpensive to manufacture.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 2:
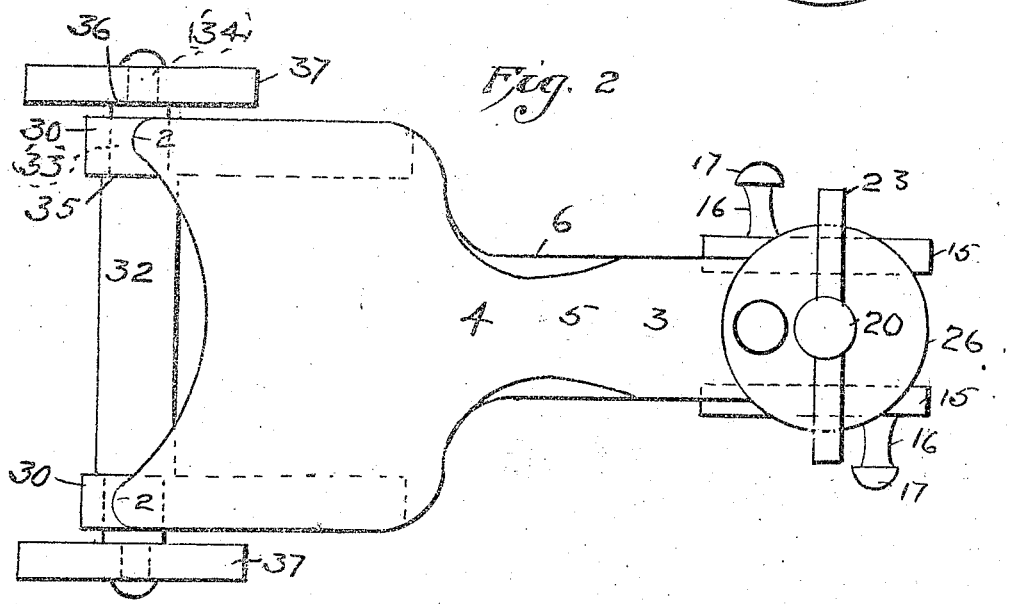

Figure 1 is a side elevation.
Fig. 2 is a top plan view.
Fig. 3 is a longitudinal section.
Fig. 4 is a rear elevation.

The vehicle comprises a sectional body portion, one section consists of a platform having a substantially rectangular rear portion 1, and a contracted or narrow elongated front portion 3. The rear portion 1, provides a seat, and has its rear corners rounded as at 2, and its rear edge between the ends thereof concavo-convex.

The narrow portion 3 is disposed centrally with respect to the rear portion 1, and said narrow portion 3, at the rear thereof diverges as at 4. The intermediate part of the front portion 3 has the edges thereof rounded as at 6, and the forward part 7, of said narrow portion 1 has the side edges thereof squared. The forward part 7, of the narrow or front portion 3, of the platform is provided with a pair of spaced openings 8, 9, disposed in longitudinal alinement with respect to the length of the narrow portion 3.

The reference character 9' denotes a steering post having a cylindrical intermediate portion 10, and a squared upper portion 11, and a squared lower portion 12.

The squared lower portion 12 is formed with a transverse opening 13, in which is mounted a revoluble front axle 14 and fixed to each end of the axle 14 is a disk 15 provided with an outwardly projecting eccentrically disposed supporting arm 16 having its free end provided with a head 17. The disk 15 constitutes the front wheels of the vehicle or car and the arm 16 of one disk is arranged out of alinement with respect to the arm 16 of the other disk.

The upper squared portion 10 of the steering post 9' is provided with a vertically disposed socket 18, for a purpose to be presently referred to, and said upper portion 10 is furthermore provided with a transverse opening 19 which communicates with the socket 18. The function of the openings 19 will be presently referred to.

Associating with the steering post 9' is a handle member 20 having its lower end reduced as at 21 and said lower end 21 has a transverse opening 22. Secured to the upper end of the member 20 is a handle bar 23.

The reduced lower end 21 of the member 20, provides the latter with a shoulder 24, and said reduced lower end 21 is adapted to extend through an opening 8 or 9, of tongue 3, and engage in the socket 18. When said end 21 is positioned in the socket 18 the openings 19 register with the openings 22 and a pin 25 is inserted in said registering openings, whereby the handle member is connected to the steering post.

The other section of the body portion consists of a circular disk 26, which is provided to increase or decrease the length of the body portion when desired. The disk 26, is mounted upon the front part 7, of the narrow portion 3, and is formed with a centrally disposed opening 28, and also with an opening 29 which is arranged between the opening 28 and the periphery of the disk 26.

The normal position of the disk 26, is with the opening 29, registering with the opening 8, and with the edge of the disk flushed with the free terminus of the front part 7 of the narrow portion 3.

If the length of the body portion is to be increased, the disk 26 is shifted so that the openings 29 and 9 register the disk 26 will then project beyond the free terminus of the front 7 of the narrow portion 3 increasing the length of the body portion. A pin 29' is provided for locking the disk in adjusted position.

When the handle member is connected to the steering post, the reduced end 21 extends through registering openings 8 and 28, or 8 and 29, or 9 and 29, or 9 and 28, and the shoulder 24 abuts against the upper face of the disk 26.

Fixedly secured to the lower face of the body portion 1, in the direction of the length of the body portion, and near each side edge thereof, is a bolster 30 which decreases in width from its upper toward its lower end and is inclined to project rearwardly. The bolsters 30 are arranged in parallelism.

Associated with the bolster 30 is a stationary axle bar consisting of an enlarged intermediate portion 32, reduced end portion 33 and headed pintles 34 projecting from the end portions 33. The reduced portions 33 extend into the lower ends of the bolster 30.

The reduced end portions 33 provide shoulders 35 which abut against the inner faces of the bolsters 30 under such conditions the pintles 34 are positioned outwardly with respect to the bolsters 30.

The reduced end portions 33, in connection with the pintles 34, provide shoulders 36, and mounted on the pintles 34, and interposed between the shoulders 36 and heads of the pintles are revoluble circular disks 37 which constitute the rear wheels of the car or vehicle.

In view of the manner in which the end portions and pintles are set up with respect to the bolsters 30, the disks 37, are maintained clear of the outer faces of said bolsters 30.

The supporting or crank arms 16 and the disks 15 provide foot rests for the child and also act as a means to enable the braking of the speed of the vehicle by the application of pressure thereto from the child.

What I claim is:—

1. A child's vehicle comprising a body portion consisting of a pair of sections, one of said sections comprising a platform having a wide rear portion and a contracted forward portion said contracted forward portion having a pair of openings, the other of said sections comprising a disk seated upon said contracted portion and having a pair of openings registering with the openings in the contracted portion and said disk capable of being shifted to project beyond said narrow portion to increase the length of the body portion, and a steering post provided with front wheels and handle-bar extending down through said disk and said narrow portion and connected to said post and rear wheels connected with the rear portion of said platform.

2. A child's vehicle comprising a body portion consisting of a long and short section, said short section mounted upon the forward end of the long section and capable of being shifted to project beyond said forward end to increase the length of the body portion, rear wheels connected with said long section, a handle-bar extending through said sections and front wheels connected with said handle-bar.

3. A child's vehicle comprising a body portion consisting of a pair of sections one of said sections comprising a platform providing a seat and the other of said sections consisting of a disk mounted upon the forward end of said platform and capable of being shifted to project beyond said forward end to increase the length of the body portion, said platform and disks having pairs of alining openings, rear wheels connected with said platform and handle bar extending down through a pair of alining openings and a steering post connected with said bar and provided with said wheels.

In testimony whereof I affix my signature in the presence of two witnesses.

HOMER W. CASE.

Witnesses:
MAX H. SROLOVITZ,
LUELLA H. SIMON.